United States Patent Office 3,506,645
Patented Apr. 14, 1970

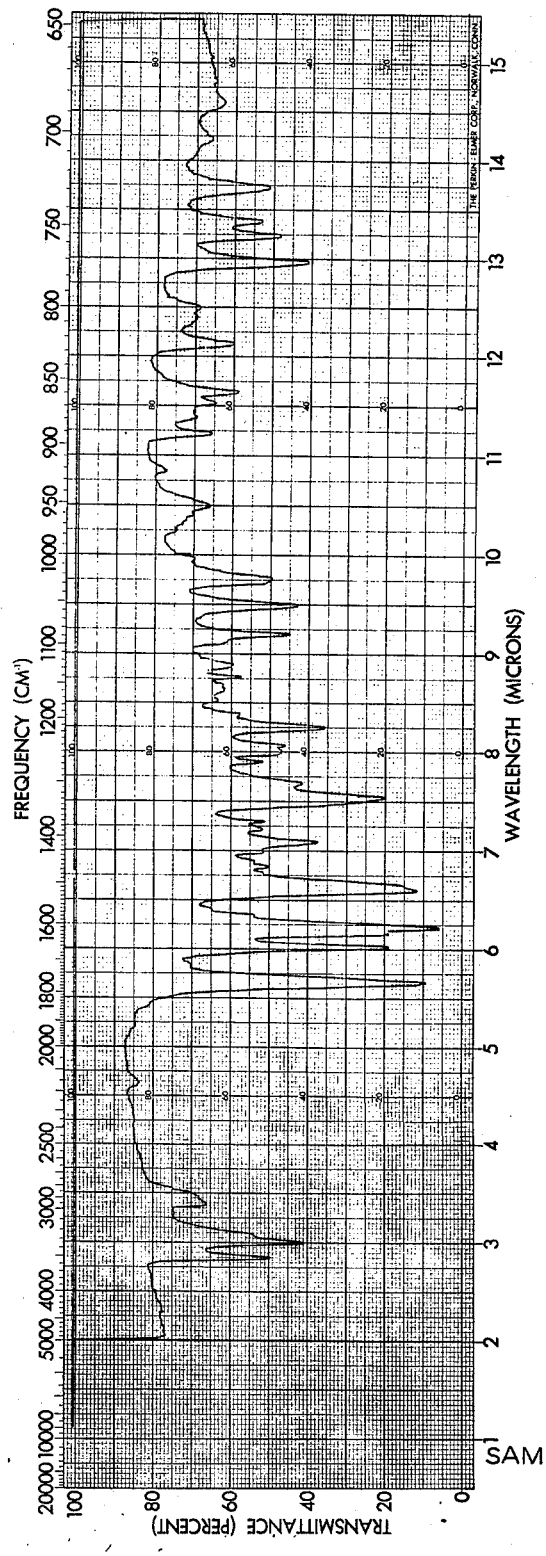

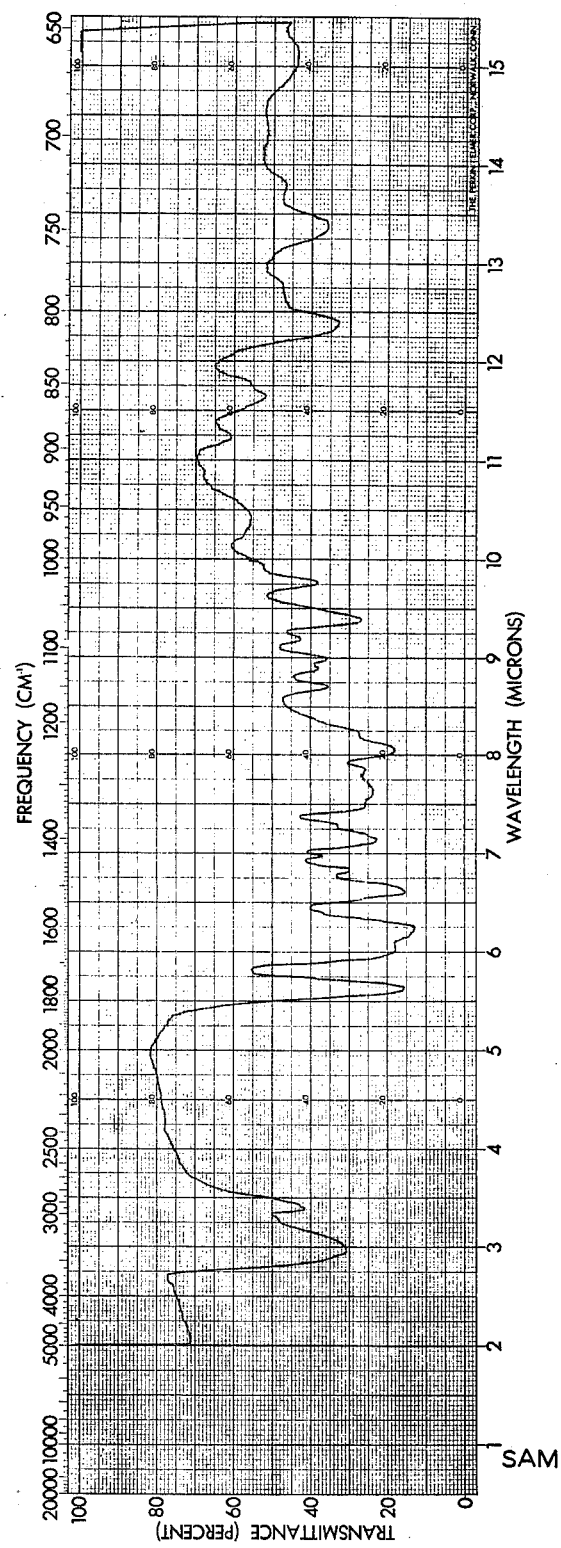

3,506,645
MONOHYDRATE OF SODIUM SALT OF 6-(2-ETHOXY - 1-NAPHTHAMIDO)PENICILLANIC ACID AND METHOD OF PREPARATION
David Flitter, Haverton, John J. Nescio, West Chester, and Samuel P. Mongelluzzo, Drexel Hill, Pa., assignors to American Home Products Corporation, New York, N.Y., a corporation of Delaware
Continuation of application Ser. No. 413,912, Nov. 25, 1964. This application May 3, 1968, Ser. No. 726,613
Int. Cl. C07d 99/16
U.S. Cl. 260—239.1                                    4 Claims This invention relates generally to the production of derivatives of penicillanic acids and more particularly to a novel form of the sodium salt of 6-(2-ethoxy-1-naphthamido) penicillanic acid and a method of preparing such form.

One form of the sodium salt of 6-(2-ethoxy-1-naphthamido) penicillanic acid is already known to the art from British patent specification No. 880,400 in which a method for the preparation thereof is disclosed in Example 29.

The previously known form of the sodium salt of 6-(2-ethoxy-1-naphthamido) penicillanic acid, now referred to in the art by the shorter generic name "sodium nafcillin" is of proven value in its broad spectrum antibacterial activity and is useful as a therapeutical agent in both veterinary and human medicine in the treatment of infectious diseases caused by gram-positive and gram-negative bacteria, upon parenteral or oral administration. Sodium nafcillin, moreover, has shown itself to have unusually good activity against many of those strains of Staphylococci that are resistant to other penicillins.

As disclosed in said British patent spec. No. 880,400, sodium nafcillin may be prepared by a method comprising the N-acylation of 6-amino penicillanic acid with 2-ethoxy-1-naphthyl acid chloride in the presence of triethylamine. The acylation is conducted by suspending 6-aminopenicillanic acid in anhydrous alcohol-free chloroform, adding the tertiary amine thereto, and then the acid chloride. The mixture is then acidified by addition of acidulated water and the aqueous layer is removed. In accordance with the process disclosed in said patent, the solvent layer is then treated with sodium bicarbonate solution and the aqueous bicarbonate layer separated and concentrated under high vacuum at room temperature to isolate the sodium salt of the penicillin product formed; i.e., sodium nafcillin. However, it has been found that superior yields of product are obtained when the aqueous bicarbonate layer is worked up further by washing with ether, covering with methyl isobutyl ketone, and acidifying again with dilute sulphuric acid to pH 2. The organic extract is then dried over magnesium sulphate and filtered. Thereafter, potassium 2-ethyl-hexanoate in methyl isobutyl ketone is added to result in a gummy precipitate that is then triturated with ether. The precipitate is dissolved in water and, only then, is concentrated in vacuo to leave the final crystalline product.

With respect to the conditions stated to be necessary for the method utilized for obtaining sodium nafcillin, these follow the warning in the patent that, since some of the antibiotic substances obtained by the general process disclosed therein are relatively unstable compounds, which readily undergo chemical changes resulting in the loss of antibiotic activity; it is desirable to choose the reaction conditions which are sufficiently moderate to avoid their decomposition. In this connection, it is further stated in the patent, as a broad proposition, that the temperature chosen for the process of preparation of the derivatives of penicillanic acid should not exceed 30° C., and that in many cases a suitable temperature is ambient temperature. Further in this connection, each of the examples disclosed in the patent either states specifically or clearly indicates that the conditions under which recovery of the desired product is obtained is by evaporation under vacuum at no higher than room temperature.

Crystalline sodium nafcillin, prepared by the foregoing procedures, and by all other procedures as far as known, contains not more than 2% water as determined by the Karl Fischer method. This demonstrates that sodium nafcillin as prepared heretofore has been in the form of the anhydrate.

We have now made the surprising discovery that sodium nafcillin, i.e., the sodium salt of (2-ethoxy-1-naphthamido) penicillanic acid, may be prepared in a previously unknown crystalline monohydrate form. This new compound is characterised by the fact that it has from about 3.5 to about 5% water. Peculiarly, the monohydrate of sodium nafcillin is insoluble in both chloroform and acetone, whereas the anhydrate is insoluble in both said solvents. The differing crystal structure of the monohydrate form is demonstrated by its spectrograph, an example of which is shown in FIG. 1 of the drawings, when compared with the spectrograph of the known anhydrate, an example of which is shown in FIG. 2. Finally, elemental and nuclear resonance data have further substantiated that the new compound is a monohydrate.

The monohydrate compound is further distinguished in that, despite having a faster rate of solution in water, it is surprisingly of far greater stability on storage than is the anhydrate, and particularly under adverse high heat and/or humidity conditions. Because of this stability, the efficiency of production of the compound in capsule dosage form is also increased. Also, the monohydrate has desirably superior reconstitution properties, as in a Sorbo vehicle.

The foregoing differences and great advantages of the monohydrate over the anhydrate are of enhanced significance, since to utilize them, therapeutic effectiveness is not at all sacrificed. On the contrary, effectiveness of sodium nafcillin monohydrate is substantially equal to that of sodium nafcillin anhydrate on a weight-for-weight basis. For example, when mice were challenged intraperitoneally with a penicillin sensitive strain of S. aureus and a virulent strain of S. typhosa and both forms of sodium nafcillin were administered by the oral route to the separately infected mice, equal protection was afforded by each drug.

After actual dehydration, the monohydrate appears to change back to the anhydrate as has been indicated by the infrared spectrum, and becomes soluble in acetone and chloroform. It has not yet been possible to convert the solid crystalline form of sodium nafcillin anhydrate directly to sodium nafcillin monohydrate using a variety of techniques.

To demonstrate the greatly superior stability in the solid state of the monohydrate as compared with the anhydrate, a series of samples was subjected to a high heat condition for varying periods of time and assays were made for B-lactam based on iodometric and biological assays to indicate percent potency as given in Table A below:

TABLE A
[All samples maintained at 75° C.]

| Time | Percent of initial potency | |
|---|---|---|
|  | Anyhdrate | Monohydrate |
| 49 hours | 31 | 98 |
| 146 hours | 13 | 64 |
| 239 hours | 3 | 45 |

To demonstrate the surprising advantages of the new compound of the invention in practical applications, three separate lots were prepared of conventionally dosage form capsules utilizing anhydrous sodium nafcillin in the formulation thereof, and three separate lots were prepared of similar capsules, but in this case utilizing sodium nafcillin monohydrate in the formulation thereof, as given in Table B below:

TABLE B

|  | Content per Capsule (mg.) | |
| --- | --- | --- |
|  | Formula X Lots 266F–504, 506 and 508 | Formula Y Lots 266F–503, 505 and 507 |
| Sodium nafcillin anhydrous | 262.5 |  |
| Sodium nafcillin monohydrate |  | 273.5 |
| Calcium carbonate | 225.0 | 225.0 |
| Light mineral oil | 19.5 | 19.5 |
| Total weight | 507.0 | 518.0 |

As will be readily appreciated, the slight increase in the amount of sodium nafcillin monohydrate in the capsules of Formula Y of Table B in comparison to the amount of sodium nafcillin anhydrous in the capsules of Formula X, was to assure that the capsules of both formulae had therein substantially equivalent amounts of antibiotic component per se.

Utilizing the capsules of Formulae X and Y of Table B, a series of comparative storage-stability tests were performed as given below in Tables C, D and E, wherein assays in each case were made by both the iodometric and biological methods as referred in the tables:

TABLE C

[Assay results of capsules stored at 80% R.H. (35° C.), open (expressed as percent initial)]

|  | Iodometric Results | | Bioassay Results | |
| --- | --- | --- | --- | --- |
|  | Formula X (Anhydrous) Lots 266F–504, 506, 508 | Formula Y (Monohydrate) Lots 266F–503, 505, 507 | Formula X (Anhydrous) Lots 266F–504, 506, 508 | Formula Y (Monohydrate) Lots 266F–503, 505, 507 |
| Elapsed Time | Average | Average | Average | Average |
| 2 days | 97 | 101 | 95 | 94 |
| 4 days | 91 | 100 | 88 | 93 |
| 6 days | 88 | 98 | 85 | 94 |
| 8 days | 88 | 98 | 87 | 95 |
| 10 days | 87 | 99 | 84 | 93 |
| 12 days | 86 | 99 | 83 | 96 |
| 14 days | 81 | 96 | 76 | 93 |
| 3 weeks | 83 | 100 | 73 | 94 |
| 1 month | 61 | 98 | 56 | 90 |
| 2 months | 34 | 94 | 22 | 93 |

TABLE D

[Assay results of capsules stored at 50% R.H. (35° C.), open (expressed as percent initial)]

|  | Iodometric Results | | Bioassay Results | |
| --- | --- | --- | --- | --- |
|  | Formula X (Anhydrous) Lots 266F–504, 506, 508 | Formula Y (Monohydrate) Lots 266F–503, 505, 507 | Formula X (Anhydrous) Lots 266F–504, 506, 508 | Formula Y (Monohydrate) Lots 266F–503, 505, 507 |
| Elapsed Time | Average | Average | Average | Average |
| 8 days | 94 | 100 | 93 | 94 |
| 14 days | 87 | 98 | 83 | 92 |
| 3 weeks | 87 | 100 | 86 | 91 |
| 1 month | 82 | 102 | 76 | 93 |
| 2 months | 73 | 100 | 70 | 97 |

TABLE E

[Assay results of capsules stored at 60° C. (Expressed as percent initial)]

|  | Iodometric Results | | Bioassay Results | |
| --- | --- | --- | --- | --- |
|  | Formula X (Anhydrous) Lots 266F–504, 506, 508 | Formula Y (Monohydrate) Lots 266F–503, 505, 507 | Formula X (Anhydrous) Lots 266F–504, 506, 508 | Formula Y (Monohydrate) Lots 266F–503, 505, 507 |
| Elapsed Time | Average | Average | Average | Average |
| 4 days | 89 | 100 | 93 | 97 |
| 8 days | 83 | 99 | 78 | 93 |
| 12 days | 79 | 99 | 76 | 96 |
| 14 days | 75 | 96 | 68 | 94 |
| 3 weeks | 67 | 98 | 70 | 93 |
| 1 month | 53 | 90 | 50 | 82 |
| 2 months | 42 | 78 | 37 | 78 |

Other significant distinctions between the two forms of sodium nafcillin are given in Table F below:

TABLE F

| Characteristic | Anhydrate | Monohydrate |
| --- | --- | --- |
| Drying | Requires 48–72 hrs. in vacuum oven at 70–80°. | Dries quickly to final form even in circulating air oven at 45°. |
| Odor | Retains some odor | Practically odorless. |
| Moisture pick-up, 3 hrs. at 25° C. at— |  |  |
| Rel. humidity 43% | 3.4% | 0.4%. |
| Rel. humidity 58% | 3.8% | 0.3%. |
| Rel. humidity 81% | 6.3% | 0.3%. |
| Iodo assay | 98% of theory | 100% of theory. |
| I. R. spectrum | Diffuse | Different and sharp. |

Generally, the method for preparing the novel compound, sodium nafcillin monohydrate, comprises dissolving sodium nafcillin anhydrate in acetone, adding water to the solution in amount so that there are from 1 to 4 mole equivalents of water per mole of sodium nafcillin, maintaining the resulting solution at a temperature from about 0 to 60° C., and preferably at about 35 to 40° C., until crystallization occurs, and thereafter filtering the suspension to obtain crystalline sodium nafcillin monohydrate.

In an optimum exercising of the method of the invention, the solution of sodium nafcillin in acetone and water is seeded with crystals of sodium nafcillin monohydrate to facilitate deposit of product. It has also been found advantageous for obtaining maximum yield to cool the suspension to less than 10° C. prior to filtering. The filtered crystals of sodium nafcillin monohydrate may be dried at a temperature of from about 25 to about 80° C., and preferably in a circulating air oven at about 45° C. for several hours to obtain the final product, which is a white free-flowing solid having about 3.5–5.0% water (Karl Fisher) and of penicillin assay almost identical with the theoretical value for sodium nafcillin monohydrate.

As will appear to those skilled in the art, drying to the final product may be accomplished by other conventional means including heating in vacuo. However, the specific selectivity involved in the use of acetone, particularly, as solvent in the mother liquor, in order to obtain the new compound, sodium nafcillin monohydrate, will appear from the comparative experiments set forth hereinafter in Example 7.

The following examples are illustrative of the invention but are not to be considered necessarily limitative thereof:

EXAMPLE 1

Sodium nafcillin anhydrate, obtained by the preferred method of the prior art described hereinbefore, was dried in a heated vacuum rotary drier to moisture content of 4.7% (by the Karl Fisher method) and other volatiles of 2.3%.

Into a one litre flask equipped with stirrer and thermometer, there were charged 200 ml. of commercial acetone, A.C.S. grade. The stirrer was turned on and 50 gm. of said sodium nafcillin anhydrate (46.5 gm. bone-dry weight) was added. The mixture was stirred at room temperature for 15 minutes, at which time solution was complete. To this solution was added 0.40 gm. of water, thereby to provide a water/sodium nafcillin molar ratio of 1.43/1.0. Thereafter, the solution was seeded with 0.50 gm. of powdered sodium nafcillin monohydrate crystals (obtained in a prior run) to facilitate deposit of product. Within a few minutes the mix became turbid, and increasingly so with time. The mix was warmed to 40° C. and held at 38–42° C. for 2 hours, after which, the mix was cooled to 5° C. and held at 0–5° C. for 2 hours. The product, a white solid, was filtered off, dried overnight in a circulating air oven at 45° C., and then weighed. The yield (allowing for the 0.50 gm. of seed) was 45.7 gm. of sodium nafcillin monohydrate, which was insoluble in acetone and had an I.R. spectograph as shown in FIG. 1 of the drawings.

EXAMPLE 2

The procedure of Example 1 was followed with the difference that the amount of water added was 2.30 gm. instead of 0.40 gm., thereby to provide in this case a molar ratio of water/sodium nafcillin=2.44/1.0. The yield of sodium nafcillin monohydrate in this run was 46.8 gm.

EXAMPLE 3

The procedure of Example 1 was again followed with the difference in this case that the added water weighed 4.3 gm., thereby to provide a molar ratio of water/sodium nafcillin=3.44/1.0. There resulted in this case a yield of 46.8 gm. of sodium nafcillin monohydrate.

EXAMPLE 4

The procedure of Example 2 was followed in a series of three runs, wherein only the amount of sodium nafcillin monohydrate added for seeding was varied, to result in differing yields, as shown in Table G below:

TABLE G

| Run No. | Monohydrate Seed (gm.) | Yield (gm.) |
| --- | --- | --- |
| 1 | .01 | 46.1 |
| 2 | .25 | 46.2 |
| 3 | .30 | 48.0 |

EXAMPLE 5

The procedure of Example 2 was followed with the exception that, after the 0.50 gm. of sodium nafcillin monohydrate crystals for seeding was added, the mixture was warmed to only 30° C. for 2 hours. The ultimate yield was 47.6 gm. of sodium nafcillin monohydrate (exclusive of the amount added in seeding).

EXAMPLE 6

200 ml. of commercial acetone, A.C.S. grade, were charged to a one litre flask equipped with stirrer and thermometer. After starting the stirrer, 50 gm. of sodium nafcillin anhydrate were added and stirred in at room temperature. After the entire amount of the anhydrate went into solution (within a few minutes) stirring was continued at room temperature and the mix became increasingly turbid. After stirring the mix overnight without any addition of seed, there was ultimately obtained a heavy deposit of product. The mix was chilled to 0–5° C. and held within that temperature range for two hours. The product was filtered and dried overnight in a circulating air oven at 45° C. The ultimate yield of sodium nafcillin monohydrate was 45.7 gm.

EXAMPLE 7

(A) Sodium nafcillin monohydrate obtained by the procedure described in Example 1 was used to supply two separate samples respectively designated A(1) and A(2). Sample A(1) was subjected to 16 hours in a circulating air oven at 45° C., and sample A(2) was subjected to vacuum for 16 hours at 65° C.

(B) Twenty gm. of sodium nafcillin anhydrate obtained by the preferred method of the prior art referred to hereinbefore, were mixed with 20 ml. of water to give a viscous solution. The solution was warmed to 30° C., and to it was added 180 ml. of n-butanol which had been warmed previously to 30° C. The solution became less viscous and remained clear. The solution was then slowly cooled with stirring to 18° C., and at this temperature the entire mass gelatinized. Cooling of the mass was continued down to 3° C., at which temperature the mass was held overnight. After, the solids were filtered off, sucked as dry as possible, slurried with 50 ml. of n-butanol, again sucked as dry as possible, and then divided into two samples designated B(1) and B(2), respectively.

Sample B(1) was subjected to continuous vacuum at room temperature for 16 hours and then placed in a circulating air oven for 16 hours at 45° C. Sample B(2), immediately after the filter cake thereof, had been sucked as dry as possible, was placed in an air oven for 20 hours at 45° C.

(C) Another twenty grams of sodium nafcillin anhydrate of the prior art were mixed with 20 ml. of water to give a viscous solution, which was then warmed to 30° C. Fifty ml. of n-butanol, which had been warmed to 30° C., were added to the solution with stirring. Thereafter, there was also added to the solution 0.10 gm. of sodium nafcillin monohydrate seed crystals and an additional 130 ml. of n-butanol, which also had been warmed to 30° C. The entire mass quickly gelatinized. The mass was then stirred at 30° C. for 3 hours, slowly cooled to 3° C., and held at the lower temperature overnight. The solids were then filtered off, sucked as dry as possible and divided into two parts.

One part was divided into 2 samples, which were respectively designated C(1) and C(2). Sample C(1) was dried for 16 hours in a vacuum oven at 65° C., and sample C(2) was dried for 16 hours in a circulating oven at 45° C.

The second part was stirred with 75 ml. of n-butanol, sucked dry, and in turn, divided into two samples designated C(3) and C(4), respectively. Sample C(3) was dried for 16 hours in a vacuum oven at 65° C., and sample C(4) was dried for 16 hours in a circulating air oven at 45° C.

A comparison of the properties of the 8 final products obtained as above was then made with respect to percent water present (by the Karl Fisher method) and in connection with solubility in acetone. The results of the comparison are given below in Table H:

TABLE H

| Sample No. | H₂O% (K.F.) | Solubility in Acetone |
| --- | --- | --- |
| A(1) | 4.48 | Insoluble. |
| A(2) | 4.24 | Do. |
| B(1) | 5.32 | Soluble. |
| B(2) | 3.75 | Do. |
| C(1) | 2.4 | Do. |
| C(2) | 8.9 | Do. |
| C(3) | 2.8 | Do. |
| C(4) | 7.0 | Do. |

As appears from the foregoing, the products obtained by various methods of preparation wherein n-butanol, for example, is utilized in the mother liquor instead of acetone differ from the sodium nafcillin monohydrate compound of the invention in appearance, acetone solubility, and constancy of water content. Thus, even sample B(2), which most closely approximated the theoretical water content of 3.96% in sodium nafcillin monohydrate, differed therefrom in kind, since sample B(2) was soluble in acetone. Sample B(2), moreover, when dried further, continued to lose more water, which is not the case with the sodium nafcillin monohydrate of the invention. Most probably, sample B(2) as well as the remainder of the samples, other than samples A(1) and A(2), were the sodium nafcillin anhydrate of the prior art, on the crystals of which were absorbed varying amounts of easily removable water.

As referred to hereinbefore, sodium nafcillin monohydrate is also insoluble in chloroform. However, as a further indication of the surprising nature of our discovery of the new compound and the mode of its preparation, chloroform is of no better utility in the mother liquor for obtaining said new compound, than is n-butanol, as demonstrated above.

As appears herein, the novel monohydrate of sodium nafcillin has storage stability characteristics which are greatly superior to those of the known anhydrate of sodium nafcillin. Coupled with this highly important advantage, the new monohydrate form of sodium nafcillin is useful in all applications where the known anhydrate form has been used. In this connection, the markedly superior stability characteristics are in evidence and of advantage whether the monohydrate is in capsule or powdered form, in either oral or parenteral grades, and this is particularly true at elevated temperatures, which makes the new compound of extreme value in hot and/or humid climates, especially where refrigeration is unavailable. Furthermore, because of its decreased hygroscopicity, the monohydrate is easier to handle. In addition, the monohydrate has little or no organic solvent odor, and improvement is noted in the rate and ease of reconstitution. It has further been found that in reconstituting the monohydrate, considerably less sodium citrate for buffering is necessary, due to its higher pH, when, for example, a multiple dose is prepared, and that such multiple dose may be desirably stable for as much as one week under refrigeration. The decreased amount of citrate in turn permits use of a natural rubber closure instead of butyl, which is more costly and has inferior stoppering characteristics. Coupled with this highly important advantage, the new monohydrate form of sodium nafcillin is useful in all applications where the known anhydrate form has been used.

We claim:

1. A dried hydrated crystalline form of the sodium salt of 6-(2-ethoxy-1-naphthamido)penicillanic acid characterized by being a white free-flowing solid having from about 3.5 to about 5% by weight of water, exhibiting a penicillin assay almost identical with the theoretical value for the monohydrate of said penicillanic acid, having an infrared spectrograph as disclosed in FIG. 1 of the drawings, being insoluble in acetone and chloroform, and possessing substantially greater storage stability than the anhydrous crystalline form of the sodium salt of 6-(2-ethoxy-1-naphthamido)penicillanic acid.

2. The method of preparing a dried hydrated crystalline of the sodium salt of 6-(2-ethoxy-1-naphthamido)penicillanic acid, which method comprises: dissolving the anhydrate of the sodium salt of 6-(2-ethoxy-1-naphthamido)penicillanic acid in acetone, adding water to the solution in amount so that there are from 1 to 4 mole equivalents of water per mole of the sodium salt of 6-(2-ethoxy-1-naphtamido)penicillanic acid present, maintaining the resulting solution at a temperature from about 0 to about 60° C. until crystallization occurs, thereafter filtering the suspension to obtain the crystals formed, and finally drying the crystals to obtain the crystalline monohydrate of the sodium salt of 6-(2-ethoxy-1-naphthamido)penicillanic acid characterized by being a white free-flowing solid having from about 3.5 to about 5% by weight of water, exhibiting a penicillin assay almost identical with the theoretical value for the monohydrate of said penicillin acid, having an infrared spectrograph as disclosed in FIG. 1 of the drawings, being insoluble in acetone and chloroform, and possessing substantially greater storage stability than the anhydrous crystalline form of the sodium salt of 6-(2-ethoxy-1-naphthamido)penicillanic acid.

3. The method of preparing a dried hydrated crystalline form of the sodium salt of 6-(2-ethoxy-1-naphthamido)penicillanic acid as defined in claim 2, wherein the drying of the crystals is performed at a temperature of from about 25 to about 80° C.

4. The method of preparing a dried hydrated crystalline form of the sodium salt of 6-(2-ethoxy-1-naphthamido)penicillanic acid as defined in claim 2, wherein the water is added to the solution in amount so that there are about 2.5 moles of water per mole of the sodium salt of 6-(2-ethoxy-1-naphthamido)penicillanic acid, the aqueous mixture is seeded with crystals of the monohydrate of the sodium salt of 6-(2-ethoxy-1-naphthamido)penicillanic acid; the mixture is maintained at a temperature from about 35° C. to about 40° C. for about 3 hours, the resulting suspension is cooled to below 10° C., the suspension is stirred for about 3 hours while it is maintained below 10° C., the resulting suspension is filtered to obtain a wet crystallin product, and the product is dried at about 45° C. to constant weight water content as determined by the Karl Fischer method.

References Cited

UNITED STATES PATENTS 3,157,639    11/1964    Doyle et al. _____ 260—239.1

NICHOLAS S. RIZZO, Primary Examiner

U.S. Cl. X.R.

424—271